United States Patent
Burch et al.

(10) Patent No.: US 7,739,744 B2
(45) Date of Patent: Jun. 15, 2010

(54) METHODS AND SYSTEMS FOR MULTIFACTOR AUTHENTICATION

(75) Inventors: Lloyd Leon Burch, Payson, UT (US); Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 1062 days.

(21) Appl. No.: 11/395,725

(22) Filed: Mar. 31, 2006

(65) Prior Publication Data

US 2007/0234408 A1 Oct. 4, 2007

(51) Int. Cl.
G06F 9/00 (2006.01)
(52) U.S. Cl. ...................................................... 726/26
(58) Field of Classification Search .................... 726/12
See application file for complete search history.

(56) References Cited

U.S. PATENT DOCUMENTS

| | | | | |
|---|---|---|---|---|
| 5,586,260 | A * | 12/1996 | Hu .............................. | 726/12 |
| 5,913,025 | A | 6/1999 | Higley et al. | |
| 5,991,810 | A | 11/1999 | Shapiro et al. | |
| 5,991,878 | A | 11/1999 | McDonough et al. | |
| 6,067,623 | A * | 5/2000 | Blakley et al. .................. | 726/5 |
| 6,081,900 | A | 6/2000 | Subramaniam et al. | |
| 6,088,451 | A * | 7/2000 | He et al. ......................... | 726/8 |
| 6,950,936 | B2 | 9/2005 | Subramaniam et al. | |
| 7,188,360 | B2 * | 3/2007 | Gerdes et al. ................... | 726/4 |
| 2003/0023880 | A1 | 1/2003 | Edwards et al. | |
| 2004/0059951 | A1 | 3/2004 | Pinkas et al. | |
| 2004/0123144 | A1 | 6/2004 | Chan et al. | |
| 2004/0225878 | A1 | 11/2004 | Costa-Requena et al. | |
| 2004/0267870 | A1 | 12/2004 | Rozmus et al. | |
| 2005/0021975 | A1 | 1/2005 | Liu | |
| 2005/0188212 | A1 | 8/2005 | Laferriere et al. | |
| 2005/0283614 | A1 | 12/2005 | Hardt | |
| 2005/0289341 | A1 | 12/2005 | Ritola et al. | |
| 2006/0048216 | A1 | 3/2006 | Hinton et al. | |

FOREIGN PATENT DOCUMENTS

| | | |
|---|---|---|
| EP | 1089516 A3 | 4/2001 |
| EP | 1631032 | 3/2006 |

OTHER PUBLICATIONS

"Liberty Alliance Project—Specifications", http://www.projectliberty.org/resources/specifications.php, (Copyright 2004-2005).
"OASIS Security Services (SAML) TC", http://www.oasis-open.org/committees/tc_home.php?wg_abbrev=security, (2006).

* cited by examiner

Primary Examiner—Kambiz Zand
Assistant Examiner—Teshome Hailu
(74) Attorney, Agent, or Firm—Schwegman, Lundberg & Woessner, P.A.

(57) ABSTRACT

In various embodiments of the invention, techniques are presented for providing multifactor authentication. A first set of credentials are received, which are associated with a first principal, and at least one identifier also associated with the first principal is obtained from a second principal. Next, the first principal's knowledge of the at least one identifier is verified and an authentication credential is generated for the first principal. The authentication credential permits the first principal to access the second principal.

20 Claims, 4 Drawing Sheets

Fig. 1

METHODS AND SYSTEMS FOR MULTIFACTOR AUTHENTICATION

FIELD

The invention relates generally to network security, and more specifically, to methods and systems for providing multifactor authentication.

BACKGROUND

As connectivity to the Internet and to network applications has grown in recent years, so has the need for providing more robust network-oriented techniques for authenticating network identities. This need has been significantly heightened as more and more high-value transactions involving sensitive information such as online banking and the like are made available through the Internet.

However, adding additional layers of security to legacy applications may be expensive and error prone. For example a typical legacy application may utilize a number of front-line application servers in communication with a back-end information systems and/or databases. In order to modify the authentication system of such an application, code must be updated on each front-line server. And, if authentication is required for the back-end systems, provisions must be made to update those services with the new authentication system as well. This problem may be further complicated by the fact that many legacy applications are written using older programming languages such as COBOL, PL1, etc., which many programmers no longer use. Thus, any change to such an application is likely to be time consuming, expensive and error prone. Additionally, the maintainers of any legacy application servers may not be expert in security programming, requiring the company to bring in specialists, which in turn may give rise to additional time and expense. A similar set of problems may even arise in developing of new application service, particularly if the developers are not expert in security programming and lack the tools to develop a strong authentication system.

Furthermore, the problem cannot be ignored solely on the basis of inconvenience because the federal government has recently mandated that enhanced and improved security techniques be implemented for financial services, such as on-line banking. These institutions are now faced with difficult choices in order to comply with the new regulations, either the services are to be removed or the services are to be rewritten in order to conform to the new government regulations. Neither of these options is particularly appealing to the financial services. Thus, there is a desire to provided improved techniques for augmenting the security mechanisms of legacy applications or services without rewriting those legacy applications or services.

SUMMARY OF THE INVENTION

In various embodiments of the invention, techniques are presented for providing multifactor authentication to legacy services. According to an embodiment, a method for processing multifactor authentication services is presented. More specifically, a first set of credentials are received, which are associated with a first principal, and at least one identifier associated with the first principal is obtained from a second principal. Next, the first principal's knowledge of the one or more identifiers is verified and an authentication credential is generated for the first principal, thereby allowing the first principal to access the second principal.

DETAILED DESCRIPTION OF THE INVENTION

In various embodiments of the invention, the term "principal" is used. For the purposes of the invention, a principal is an electronic representation of an entity. An entity can be a resource, a user, an agent, an application, a system, a service, a group, a department, and object, or the like. An entity consumes information, provides information, provides a service to other entities over the network, or performs any combination of such operations.

In various embodiments of the invention, the term "authentication" is used. Authentication is a process by which one principal may confirm the identity of another principal, validating that the principal is who it claims to be. Authentication may be performed in a number of different ways. In a typical username/password authentication scheme, the authenticating principal may provide a username and password combination. The principal receiving this information may validate the information against a set of known username/password combinations stored in a database or some other storage mechanism. If the information provided corresponds to an entry in the relying principal's records, the principal's identity may be considered authenticated. There are a number of other authentication mechanisms available. For instance, the authenticating principal may provide proof it is possession of a key or toke, such key or token may reside on a Smartcard or other device or storage medium. Alternatively, biometric information may be provided such as a fingerprint, retinal pattern, etc.

Whereas the proceeding authentication methods utilize "long-term" secret information (i.e. password that is changed every few months, a Smartcard reissued every year, or biometric information that is constant), other authentication methods may utilize "short-term" credentials. Examples of short-term authentication methods may include the last log-on time, last application used, and others. Such short-term authentication methods may be desirable due to the fact that they constantly change and, as such, are less susceptible to compromise.

In various embodiments of the invention the term "multifactor authentication" is used. Multifactor authentication is a process of authenticating a principal using a plurality of authentication methods or factors. An example of a multifactor authentication technique may be illustrated by the use of an Automated Teller Machine (ATM). Authentication to an ATM requires both a valid bank card and knowledge of a personal identification number (PIN). Thus, an ATM transaction is protected by two factors of authentication: something the customer possesses, the ATM card, and something the customer knows, the PIN. Multifactor authentication increases security by requiring the principal to produce two sets of authentication credentials that can be independently verified. Thus, the principal's identity may be protected even if information associated with one of the methods is compromised (i.e. if a customer's ATM card is stolen it cannot be used to withdraw money since the thief does not know the customer's PIN). Multifactor authentication may be particularly effective when used in conjunction with a "short-term" credential since "short-term" credentials are particularly resistant to compromise.

In an embodiment, the term principal is consistent with how that term is generally understood in the computer network security arts. For example, the term principal can be used in the context of Security Assertion Markup Language (SAML) which is an extension of the Extensible Markup Language (XML). SAML is used for securely processing assertion about a user or application (e.g. principal). More recently, SAML has been extended with technology referred to as Liberty. Liberty is part of the Liberty Alliance Project (LAP) and is attributed to open interoperable standards for federated network identities. Thus, the term principal can also be used in the context of Liberty technologies.

A SAML encoded statement includes an assertion, a protocol, and a binding. There are generally three types of assertions: an authentication assertion used to validate a principal's electronic identity, an attribute assertion that includes specific attributes about the principal, an authorization assertion that identifies what the principal is permitted to do (e.g. policies). The protocol defines how a SAML processing application will ask for and receive the assertions. The binding defines how SAML message exchanges are mapped to Simple Object Access Protocol (SOAP) exchanges, or other protocol exchanges.

In general terms, SAML techniques improve security between business-to-business (B2B) electronic transactions and business-to-consumer (B2C) electronic transactions. The techniques permit one principal to log in with a single transaction to a receiving principal and then use a variety of the receiving principal's disparate services by providing the SAML statements when needed. SAML techniques are not limited to inter-organization relationships (e.g., B2B or B2C); the techniques can be used within a single organization (intra-organization). SAML techniques are supported with a variety of network protocols, such as Hypertext Transfer Protocol (HTTP), Simple Mail Transfer Protocol (SMTP), File Transfer Protocol (FTP), SOAP, BizTalk, and Electronic Business XML (ebXML). The Organization for the Advancement of Structured Information Standards (OASIS) is the standards group for SAML. The techniques of Liberty are enhancements to the SAML techniques and may be used in connection with various embodiments to the SAML techniques and may also be used in connection with various embodiments of this invention.

However, it is to be understood that SAML and Liberty techniques are not needed to perform the teachings of all embodiments of the invention. In this sense, the integration of SAML and Liberty techniques with some of the embodiments presented herein is intended to be enhancements or extensions to certain aspects of this invention, but other embodiments of this invention do not rely on or use the SAML and/or Liberty technologies.

In a similar manner there are various other existing authentication techniques that may be practiced in connection with some embodiments of this invention. But, once again these other authentication techniques are not necessary for realizing the benefits of all embodiments of the invention. Some of these techniques include Public Key Infrastructure (PKI) techniques including public-private key pairs, digital certificates, biometric authentication, or use of conventional identifications such as PIN numbers and passwords.

A policy specifies identity information and techniques or services used to authenticate a particular principal to another principal. The policy also includes directives that indicate how to perform the authentication. These policies may be established through a contract specifying the identity information and techniques or services required to authenticate a principal to another principal. The contract may also include directives that permit aggregated attribute information and aggregated policies to be assembled from one or more identity stores for a particular principal vis-à-vis another principal.

Sample techniques for secure and trusted relationships between a principal and identity service can be found in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

Various embodiments of this invention can be implemented in existing network products and services. For example, in some embodiments, the techniques presented herein are implemented in whole or in part in the iChain®, Border Manager®, and Excelerator® products distributed by Novell, Inc., of Provo, Utah.

Of course, the embodiments of the invention can be implemented in a variety of architectural platforms, systems, or applications. For example, portions of this invention can be implemented in whole or in part in any distributed architecture platform, operating systems, proxy services, or browser/client applications. Any particular architectural layout or implementation presented herein is provided for purposes of illustration and comprehension only and is not intended to limit the various aspects of the invention.

It is also noted that various embodiments of this invention can be implemented using a front-end service. A reverse proxy may be implemented within one or more proxy servers and installed in conjunction with the one or more servers. In a typical embodiment, the front-end service is positioned in the network topology such that network traffic originating from select principals an external network is routed through the front-end service before reaching the targeted services. Generally, the reverse proxy resides within the local environments of the target services and not environment of the originating or requesting principals. As part of the routing, the front-end service may process select messages as they are being routed to the targeted services. Similarly, the response data from the targeted services may be processed by the reverse proxy before as they are routed to the destination, originating, and/or requesting principals. Proxies within a local environment of an originating or requesting principal are often distinguished as transparent or forward proxies. A transparent proxy is not known and preconfigured to interact with the principal; it intercepts communications originating from the principals unbeknownst to those principals. A forward proxy is configured to interact with the principal, such that the principal knowingly routes traffic through the forward proxy.

Given its topological position in the network, the reverse proxy is ideally positioned to act in a gate-keeping function, denying or granting access to the servers it proxies. In this sense the reverse proxy may act as a policy enforcement point, only allowing access to its servers to principals who have adequately authenticated their identity and/or fulfill other policy requirements.

Thus, the architectural position of a reverse proxy, in various embodiments presented herein, permits legacy services to be enhanced without altering the legacy services, since the features and interactions being extended in the legacy service may be handled in novel manners by the reverse proxy positioning and capabilities. It is however noted, that a reverse proxy implementation is not necessary for each embodiment scenario presented herein where multifactor authentication is achieved in a novel processing manner; the details of which are discussed in greater detail with references to the FIGS.

Figure 1:
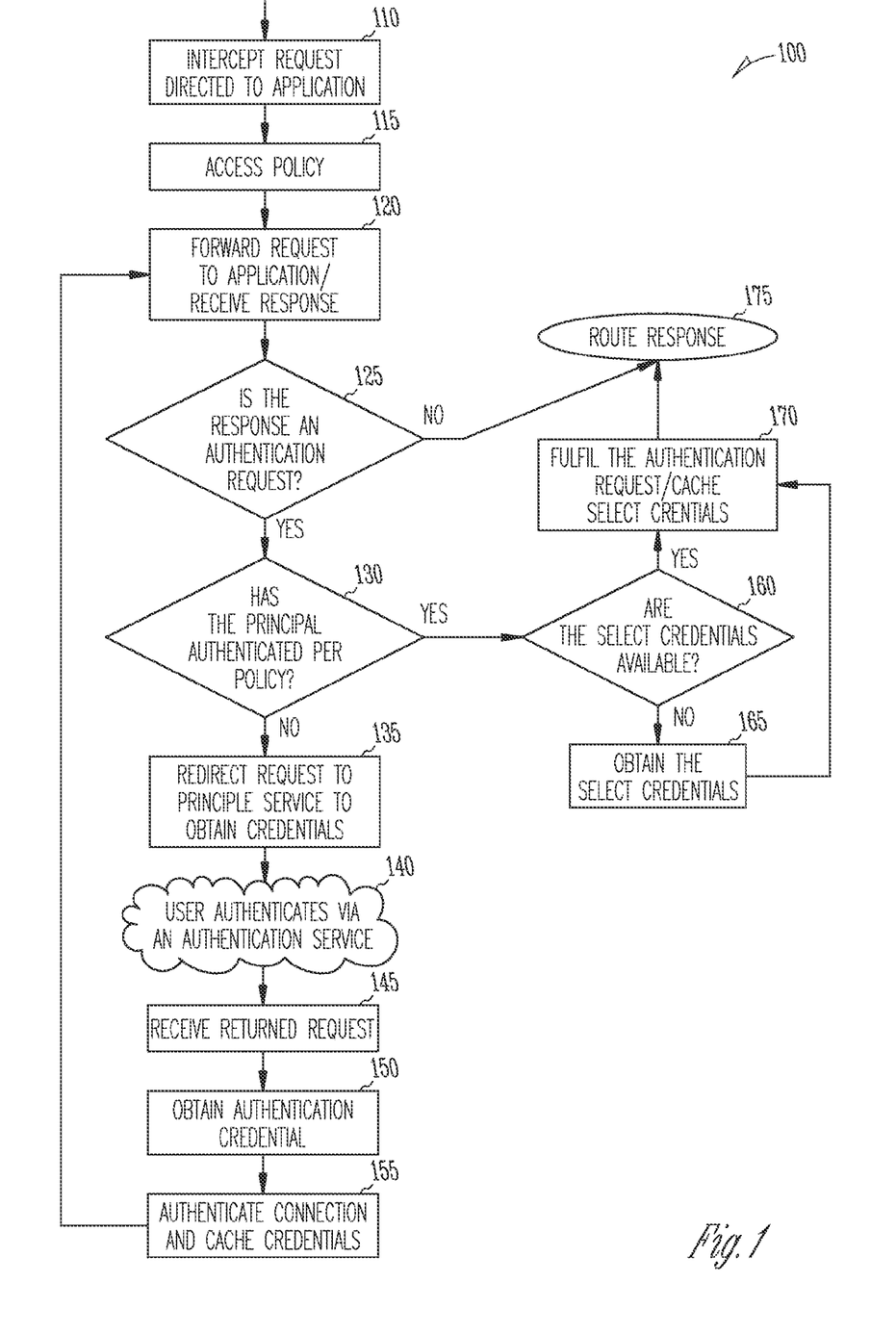
FIG. 1 illustrates a diagram of a method for multifactor authentication, according to an embodiment of the invention.

FIG. 1 is a diagram illustrating a method 100 for providing multifactor authentication services, according to an embodiment of the invention. The method 100 (hereinafter "front-end service") may be implemented as instructions residing in or implemented on a machine-accessible medium and accessible over a network. The network may be wired, wireless, or a combination of wired and wireless.

According to an embodiment, the front-end service may be implemented as one or more applications or services running in conjunction with or on a reverse proxy. In this embodiment the one or more applications or portions of the applications may process on the reverse proxy itself or may process on a remote computing system in communication with the reverse proxy. The use of the phrase "front-end service" should not be read as limiting the invention to only embodiments where the applications are implemented on a reverse proxy nor to embodiments that necessarily require a reverse proxy. That is, any front-end process to a legacy principal or legacy service that desires to integrate multifactor authentication techniques may benefit by and use the front-end service; regardless of whether a specific reverse proxy is being used in such a scenario or architectural setup.

The front-end service is in communication with a first principal. The first principal may represent a computer user accessing network services over the Internet via a World-Wide Web (WWW) browser such as Mozilla Firefox®, etc. The front-end service is also in communication with at least one second principal, the second principal being an application server or service the first principal wishes to access. The second principal may be viewed as a legacy service, such as but not limited to a legacy banking or financial service providing the first principal with access to banking or financial services.

It is also noted that the front-end service does not have to be executing; that is, the instructions for the front-end service may in embedded within a machine-accessible medium. The medium may be removable, such that when interfaced to a machine the instructions can be uploaded to the machine and executed within the environment of the machine as the front-end service. Similarly, the instructions may be prefabricated within a medium of a machine associated with memory or storage and when loaded and accessed the front-end service is executed to perform the processing depicted in FIG. 1. Further, the instructions may be downloaded from one medium or machine on a network to another medium or machine of the network and subsequently executed.

Initially, the first principal requests access to the second principal. In a prototypical Internet environment, this request may be made by directing the first principal's WWW browser to an Internet Protocol (IP) address associated with the second principal (legacy service); the request being issued via the Hypertext Transfer Protocol (HTTP).

The request is intercepted by the front-end service, at 110. In an embodiment, at 115, and upon receipt of the request, the front-end service accesses policy information. The policy information may indicate whether the first principal has to authenticate its identity before access to the second principal is granted. The policy information access, at 115, may be performed in a number of different ways.

For example, the policy may be stored in volatile or non-volatile random access memory (RAM), disk drive, or the like disposed within the processing environment of the front-end service. Alternatively, the policy information may be located on another computer in communication with the front-end service. In the latter configuration, access to the policy information may be obtained via a network communications link using a protocol such as Structured Query Language (SQL), Lightweight Directory Access Protocol (LDAP), etc.

The policy information associated with the second principal may also specify an authentication service to be used for authenticating the identity of the first principal and it may include the authentication mechanisms that are to be used (i.e. strong password, Smartcard, biometric, multifactor, etc). The authentication service, which is specified in the policy information, may also be provided by a third-party authentication service provider, such as a SAML Authentication Authority or Liberty Identity Service. The policy information may also specify the select credentials used to authenticate the identity of the first principal to the authentication service or technique expected and used by the second principal. Thus, the policy information permits the type of authentication used to be identified pursuant to a policy while also providing the select credentials used by the authentication service of the second principal. Furthermore, the select credentials may be completely unrelated to the authentication mechanisms required by the policy. Thus, a previous one dimensional authentication technique may be enhanced to be operational for a multidimensional or multifactor authentication technique, since an expected authentication is performed and new select credentials, which may be unrelated, may also be added to create a multifactor authentication technique.

Once policy information associated with the second principal is obtained, at 115, the front-end service may cache the information in short term storage, such as RAM, etc., to increase processing throughput of future transactions. Similarly, the policy information, associated with the second principal, may be loaded when the front-end service is first initialized at startup.

The policy information may also indicate that the request is to be routed directly to the second principal. If so, the front-end service may forward, at 120, the request to the second principal and intercept the response. Upon receipt of the reply from the second principal, at 125, the front-end service may examine the reply to determine whether it is an authentication or authorization request from the second principal. If this inspection indicates that the response is not a request for authentication, at 175, the front-end service may route the response to the first principal.

If the inspection, at 125, indicates that the response is an authentication or authorization request, the response may not be returned to the first principal. Such a response indicates that the authentication service associated with the second principal requires the first principal to authenticate its identity before access may be granted. Alternatively, the policy information, accessed at 115, may have indicated that the first principal is to authenticate before messages originating from the first principal are to be routed to the second principal.

Providing the proper authentication materials may be critical to the proper operation of the second principal as it may be an application server or service providing customized services. For example, the second principal could be providing an online-banking service, in such a system the identity of the first principal using the service must be known and verified to assure that the proper account is accessed.

Traditionally, such an authentication request would be routed back to the first principal who would provide the appropriate credentials directly. The second principal would receive the credentials and authenticate the identity of the first principal. However, the authentication mechanism of the second principal may have been deemed insufficient to provide an adequate level of security, or may have become too difficult to maintain. That is, the second principal may be a legacy service that needs extended to support multifactor authentication. As such, the administrators of the second principal may wish to predicate access on a more sophisticated authentication policy involving multifactor authentication. An example may be the existing online banking industry and their services (second principals) that are not designed to support multifactor authentication, but recent developments in governmental regulations are foisting multifactor authentication on the banking industry. The conventional approaches cannot address this issue without requiring substantial rewriting or elimination of the existing banking services. Yet, the techniques presented herein permit these existing banking services to remain unchanged and still integrate multifactor authentication to comply with new governmental regulations, this is achieved through the front-end service.

The policy information may necessitate that the first principal authenticate its identity at an external authentication service, which implements a multifactor authentication scheme. The strength of the multifactor authentication scheme integrated is configurable. At 130, another determination is made to determine whether the first principal has authenticated its identity using mechanisms consistent with the policy information associated with the second principal. If this check is negative, the first principal may be redirected, at 135, to an external authentication service.

The external authentication service may be managed by the providers of the second principal, the front-end service, or by a third-party. The service itself may be provided as a Liberty Service Provider, Liberty Identity Service, SAML Identity Service, or any other entity capable of authenticating the identity of the first principal in accordance with the policy requirements associated with the second principal. At 140, the first principal authenticates its identity; this authentication processing is described in greater detail with respect to the description of FIG. 2 and FIG. 4, discussed below.

After successfully authenticating, at 140, and in the manner required by the policy information obtained, the authentication service redirects the first principal's request back to the second principal. At 145, the request is routed to and received by the front-end service. The received request may include information that allows the front-end service to access an authentication credential generated for the first principal by the authentication service.

For example, an authentication service, which implements the Liberty or SAML specification, may encode a token within the redirected request's Uniform Resource Locator (URL). In such a scenario, the processing, at 150, may open a secure communication link to the authentication service and issue a request for the authentication credential, which is associated with the token. The authentication service may then respond to the request by providing the credential associated with the token. Thus, at 150, the front-end service obtains the authentication credential. Alternatively, the authentication credential for the first principal may be embedded within the redirected request message received at 145 as in the Liberty and SAML POST profile. There are a number of different ways the credential may be obtained; embodiments of the invention should not be read as limited to any particular technique for obtaining that credential.

Once the authentication credential for the first principal is been obtained, the front-end service may, at 155, verify the credential's authenticity and authenticate the first principal. If the authentication credential was obtained over a secure connection with the authentication service, the credential may be verified via the underlying communications protocol. For instance, if the communications link used to transfer the credential was secured via mutually authenticated secure socket layer (SSL), the identity of the authentication service providing the credential may have been validated as part of the handshake mechanism used to setup the SSL connection. Alternatively, the authentication credential itself may be cryptographically signed using techniques used with the Public Key Infrastructure (PKI) arts. Verifying such a signature may include: validating the signature on the credential against a public key certificate that is either included as part of the credential or otherwise available, verifying that the public key certificate used to validate the signature was itself signed by a trusted root certificate, and finally, checking the revocation status of the public key certificate by consulting a Certificate Revocation List (CRL) or making an Online Certificate Statute Protocol (OCSP) query to the issuer of the trusted root certificate. The trust relationships required for PKI authentication of the message may be specified by the policy. Verification of the message using PKI digital signatures is only one possible scenario of performing such verification; thus, the embodiments of the invention should not be read as being limited to just embodiments utilizing PKI verification techniques.

After verifying the authenticity of the authentication credential obtained, the front-end service may authenticate the connection of the first principal, as depicted at 155. This may be performed in a number of different ways. In one embodiment, the use of web-browser cookies may be used to allow the front-end service to identify subsequent requests with the authenticated first principal. Alternatively, URL rewriting may be employed, which may encode session identifying information into the URL of subsequent requests routed through the front-end service. Again, it is noted that embodiments of the invention should not be read as being limited any particular method of connection authentication and/or session management as many other techniques may also be implemented without departing from the beneficial teachings presented herein.

After successfully authenticating the session of the first principal, at 155, the first principal's request may be reissued to the second principal back at the processing depicted in 120. Reissuing the original request may be done using a variety of different mechanisms. For example, in the Liberty and SAML context, the received request, at 145, may contain a URL tag indicating a resource that the first principal ultimately wishes to access after authentication; in the Liberty and SAML specifications this is referred to as the target URL. In such a scenario, the front-end service may parse the target URL from the request URL received, at 145, and reissue it to the second principal, at 120. Alternatively, the front-end service may cache the request URL before redirecting the first principal to the authentication service, at 135.

The request is reissued to the second principal, at 120, and the response from the second principal is obtained. The front-end service may determine, at 125, whether the response from the second principal is an authentication request. Since the reissued request is the same that prompted an authentication request previously, the response, at 120, will likely be an authentication request. At 130, the front-end service determines whether the first principal has authenticated its identity, as required by the policy information. Since the first principal was redirected to the authentication service, at 140, and a credential authenticating the principal's identity was retrieved, at 150, this determining is positive.

At 160, the front-end service determines whether the select credentials, required by the second principal to authenticate the identity of the first principal, are available. This processing may be used because the select credentials requested by the second principal may be completely distinct from those used at the authentication service discussed in connection with the processing at 140, 150, or 155. This situation may arise if developers of the application, associated with the second principal, desired to increase security, but determined that updates to the legacy authentication service of the second principal would too expensive and/or time consuming to be practical. In such a situation, multifactor authentication may take place at the authentication service while the legacy authentication scheme of the second principal may remain unchanged. Similarly, in developing a new application, developers may determine that it may be more cost effective to leverage an existing or standardized authentication service; rather than to develop or buy a completely new proprietary security system or service. In such cases, the authentication service itself may be very simple (i.e., just enough to make the association between a first principal and an identity on the system). But, by enforcing a security policy, at 115, and by utilizing the authentication service, at 140, the second principal may be protected using a multifactor authentication mechanism. This is so, because no first principal may access the second principal directly; instead access is routed through the front-end service where the front-end service requires that the first principals authenticate using mechanisms or techniques that comply with the second principal's policy, which identifies an additional multifactor authentication technique.

By way of example, the second principal may be an application server of an on-line banking system or service. In this case, the authentication service of the second principal may only require an account number and PIN to obtain access to the on-line banking service. However, in order to increase security, a policy may stipulate that the first principal is to also authenticate using a sophisticated multifactor authentication mechanism, depicted at 140. The multifactor authentication mechanism may include a password and, perhaps, the principal's last bank transaction (or any other additional authentication criterion or criteria). As such, it may be common and even desirable, that there be a mismatch between the authentication credentials required for authentication to the authentication service from those that are sent to the second principal, at 170. However, in order for this scenario to function seamlessly, the front-end service provides the second principal with the credentials it expects. Yet, the first principal never gains true access unabated until the additional credentials are also provided (last bank transaction).

If the check, at 160, indicates that the select credentials required by the second principal are not available, the select credentials have be obtained, at 165. There are a number of ways the select credentials may be obtained. For example, a Liberty or SAML attribute request could be issued to a Liberty or SAML attribute authority associated with the first principal. As per the proceeding example, an attribute request, at 165, may be issued for the first principal's account number and PIN; the attribute request including information, which allows the attribute authority to verify that the request was made from a trusted entity. Responsive to this request, the attribute authority may return an attribute assertion containing the required select credentials. The communication of the request and response may be secured using mutually authenticated secure socket layer (SSL) transport, IPSec, or any other secure communications protocol. The contents of the attribute authority may be authenticated using PKI tools or other message authentication mechanisms. Alternatively, the policy accessed, at 125, may have specified the select credentials used for authentication to the second principal. Thus, the authentication service may have provided the credentials as part of the authentication credential message received at 150 and cached at 155.

Once the select credentials associated with the first principals are obtained, at 165, they may be cached for use in subsequent sessions or to authenticate the first principal to other principals associated with the front-end service. The select credentials may then be used to perform a proxy-authentication, as depicted at 170. Proxy-authentication includes authenticating the connection between the front-end service and the second principal with the identity of the first principal, thereby allowing the front-end service to make requests as a "proxy" of the first principal. This may be done in a variety of different manners. In an example, using the HTTP protocol, the "authorization header" of subsequent HTTP requests made on behalf of the first principal may be processed to include the select credentials required by the second principal.

Thus, as part of the message processing function associated with the front-end service, the front-end service may set the authorization header on each message received from the first principal as it is routed to the second principal. Under this scenario, the second principal validates the information provided in the HTTP authorization header and authenticates the connection of the front-end service as if it were the first principal. The front-end service may include the HTTP authorization header in subsequent requests from the first principal to the second principal for the duration of the first principal's session, as may also be stipulated by the policy information. From the perspective of the second principal, it appears that the first principal itself has directly authenticated using its own means of authentication, and the front-end service may route the reply messages from the second principal to the first principal, at 175.

Thus, the first principal is granted seamless access to the second principal. And access to the second principal has been protected using a multifactor authentication mechanism, without altering the processing flow or processing aspects associated with the second principal. In other words, the multifactor authentication technique was implemented and enforced with no changes or modifications to the second principal. Using this technique, a high level of security is achievable with a minimal impact on existing or new application services that have no native multifactor authentication functionality.

It is also noted that in some embodiments there may be multiple instances or variations of a front-end service that assist in producing multifactor authentication for a given legacy service (second principal). That is, two or more front-end services may each require different authentication information to be verified before the user (first principal) is given access to the legacy service (second principal). Moreover, some of the front-end services may require additional authentication information that is independent of and not necessarily available in the legacy service (second principal). So, as an example, a legacy bank service may maintain its traditional access via an identification and a password, but access may be restricted such that a user cannot access the bank service without first satisfying two front-end services of the bank service. One front-end service may use an identity service or third-party service to have the user validate additional information known to the bank service about the user. The identity service does this by logging into the bank service as the user using the user's identification and password or credential supplied by the first front-end service. The user is then challenged by either the first front-end service or the identity (third-party) service to validate the additional information. If successful, then the first front-end service may pass the user to a second front-end service. The second front-end service may ask for confidential information not associated with the bank service, such as account number to the second front-end service or some other information perhaps maintained by the second front-end service. If this is successful, the user is given a credential that permits the second front-end service to allow the user to access the bank service. So, the point is that multiple layers of front-end services or even identity services may be used with the teachings and embodiments presented herein to achieve custom and desired multifactor authentication on legacy services, with out altering those legacy services.

Figure 2:
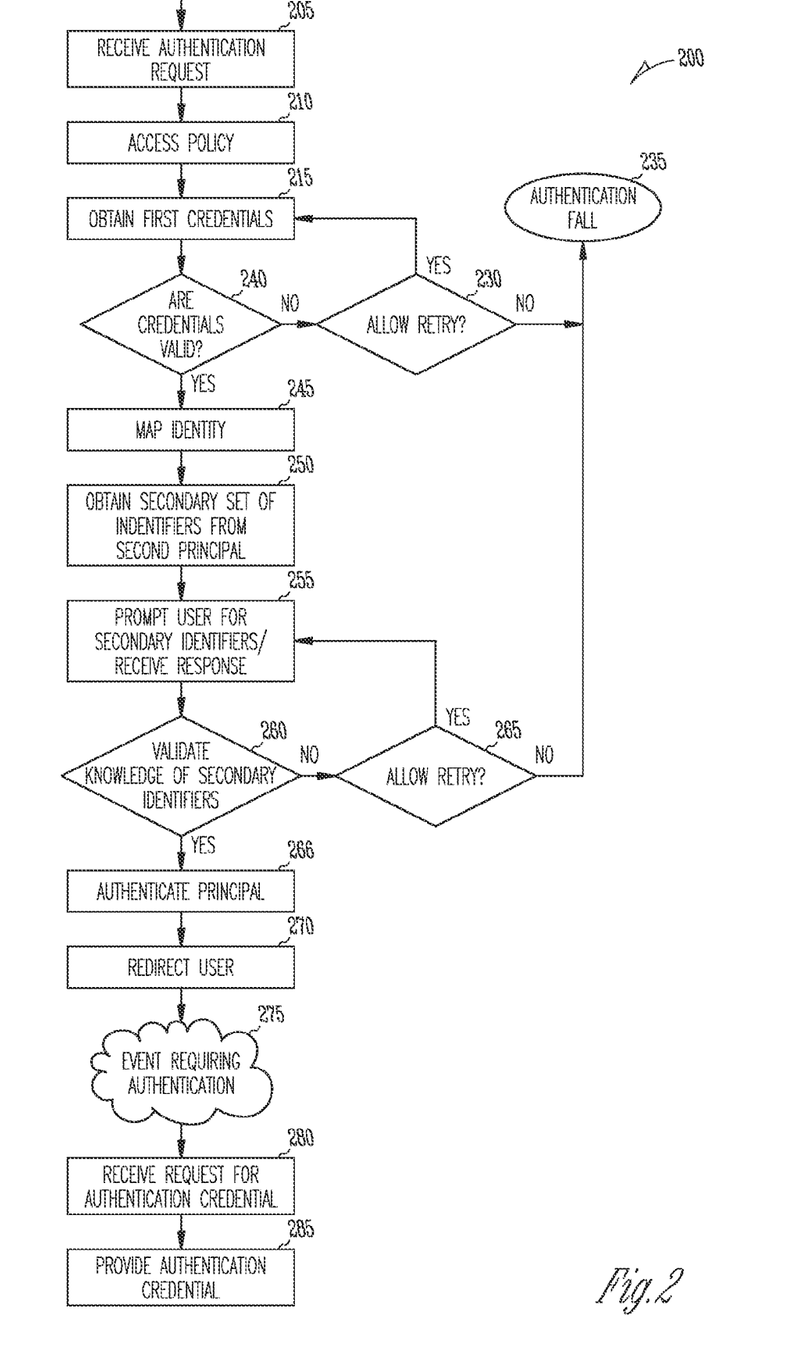
FIG. 2 illustrates a diagram of another method for multifactor authentication, according to an embodiment of the invention.

FIG. 2 is a flowchart representing a method 200 for providing multifactor authentication services, according to an example embodiment. The method 200 (hereinafter "authentication service") is implemented within a machine-accessible and readable medium and is accessible over a network. The network may be wired, wireless, or a combination of wired and wireless. In an embodiment, the front-end service represented by the method 100 of the FIG. 1 interacts with the authentication service to acquire the multifactor authentication.

In an embodiment, the authentication service may be implemented as one or more applications running in conjunction with service such as a Liberty Identity Service, Liberty Service Provider, SAML authentication authority, etc. In such a case, the authentication service may process on the computer implementing the services or it may process on a remote computing system in communication with the services.

At 205, the authentication service receives an authentication request. This request may be received on a communications link on the Internet via an HTTP protocol. However, the invention should not be read as limited to just embodiments that utilize HTTP protocols; thus, embodiments may be practiced using any network communication protocols.

The request may be received as the result of an attempt by a first principal to access a second principal. So, a determination may have been made that the first principal must first authentication its identity before being granted access to the second principal. As such, the request may have been redirected to the authentication service in order authenticate its identity in the manner prescribed by a policy associated with the second principal as was discussed with respect to the front-end service represented by the method 100 of the FIG. 1.

The authentication request received specifies the principal who wishes to authenticate its identity; this entity may be referred to as the first principal. The authentication request may also specify the principal representing the resource the first principal wishes to access; this entity may be referred to as the target resource and second principal, respectively. In accordance with the example used in the description of method 100 in the FIG. 1, the first principal may represent a computer user attempting to access a service via the Internet using a WWW browser and the second principal may represent an application server/service providing the desired service.

Responsive to the receipt of the authentication request, policy information associated with the target resource and second principal is accessed, as depicted at 210. The policy information accessed may be accessed in a number of different ways. For example, the policy may be stored in volatile or non-volatile random access memory (RAM), disk drive, or the like and disposed on the computer or an environment processing the authentication service. Alternatively, the policy information may be located on another computer in communication with the authentication service. In such a configuration, access to the policy information could be obtained via a network communications link using a protocol such as Structured Query Language (SQL), Lightweight Directory Access Protocol (LDAP), etc.

The policy information accessed may also specify the authentication mechanisms or even processing sequences that are to be performed in order to authenticate the identity of the first principal. The policy information may also specify certain secondary identifiers, which may be used during the authentication process, and how these secondary identifiers may be obtained; the use of such secondary identifiers is discussed in greater detail below.

In one multifactor authentication processing scenario, the first principal may be required to produce a first set of credentials. This first set of credentials may be a username and password. At 215, the first set of credentials are obtained by the authentication service directly from the first principal or indirectly from the first principal via a front-end service, such as the front-end service represented by the method 100 of the FIG. 1. Responsive to receipt of the first set of credentials the authentication service validates the credentials, as depicted at 240. The first set of credentials may be validated in a number of different manners. For instance, if a password were used, the authentication service may apply a one-way hashing function to the password received from the first principal. Such hashing functions are well known in the computing arts and are commonly used to transform an arbitrary sequence of data into a discrete set of bits. Some examples of hashing algorithms include SHA1, MD5, HAVAL, etc. Upon receipt of the password over a secure communications link, the authentication service may apply a specified hashing algorithm to it. The supplied password may then be verified by comparing its resulting hash-value to a hash-value associated with the username provided by the first principal. There are a wide variety of different password verification methods, which may be configured for use. Therefore, embodiments of the invention should not be read as limited to any particular verification mechanism. Similarly, there are a number of different forms the first set of credentials may take. For example, rather than a password, the first credentials may include a PKI key/certificate pair possibly stored on a Smartcard, a biometric such as a fingerprint, etc. Furthermore, embodiments of the invention should not be read as limited to any particular mechanism used for obtaining and verifying the first set of credentials.

If the validation attempt, at 240, indicates that the first credentials are not valid, the first principal may be allowed to re-enter the credentials again, at 215. This process may be referred to as a "retry attempt." At 230, the authentication service may make a determination as to whether to allow a retry attempt to occur. For example, the policy information may stipulate the number of retry attempts that the first principal is allowed to have. If the first principal exceeds the number of allowed retry attempts, at 235, then the authentication process may fail. The failure of the authentication process may cause the principal to be redirected to a support page indicating how it may unlock its account and/or reset its first set of credentials. If the retry checking, at 230, indicates that additional retries are allowed, then the authentication service may re-prompt the first principal for the first set of credentials again at 215.

If the validation attempt, at 240, indicates that the first credentials are valid, then the authentication service may obtain a second set of identifiers, at 250, using a mechanism specified in the obtained policy information. However, before the secondary identifiers may be obtained, a name mapping function may be used for translating the naming information, associated with the first set of credentials, into a namespace associated with the secondary set of identifiers. The policy obtained information may indicate whether name mapping is used and may stipulate the mapping function to apply. The mapping may occur, at 245, and after the authentication service has verified the first principal's knowledge of the first set of credentials. There are a number of different methods or functions that could be used to perform the name mapping. In one case, the mapping function may be a one-to-one correspondence between a supplied username and the associated record maintained by the second principal. In a more complex scenario, where, for example, the first credentials comprise a Smartcard™ or biometric, a more complex mapping scheme may be used, such that portions of the naming information, associated with the first principle, are replaced via a LDAP search or lookup table.

Once the identity of the first principal has been mapped into the namespace of the second principal, the second set of identifiers may be obtained, as depicted at 250. The second set of identifiers may be accessed in a number of different manners. For example, the source of the second identifiers may provide a network interface to the application service. Such an interface could be provided using the Simple Object Access Protocol (SOAP), ebXML, etc. In such a case, the authentication service may issue a request for the identifiers to an information system via an appropriate protocol. The request may include the result of the mapping operation and/or the first credentials obtained. If the second principal does not provide a network application programming interface (API), then the authentication service may obtain the secondary set of identifiers via a user interface (UI), which is associated with the second principal. For instance, many information systems provide terminal based UIs using protocols such as TELNET. Such interfaces were common before the widespread adoption of web-services. If such an interface is available, the authentication service may open a terminal connection to the banking interface and, possibly using the first set of credentials provided login as the first principal. After logging into the application, the authentication service may "screen-scrape" the terminal UI to obtain the select identifiers. Such identifiers may include "short-term" identifying information discussed above with respect to the FIG. 1. For example, if the first principal were authenticating to an online banking service, the secondary identifiers could include short-term confidential information regarding her account such as the most recent balance, last transaction, etc.

Once the select secondary identifiers are obtained, at 255, the first principal may be prompted to verify its knowledge of the identifiers. At 260, the authentication service may verify the first principal's knowledge of the secondary identifiers. If the verification attempt is unsuccessful, the first principal may be allowed one or more "retry attempts," at 265, as specified by the policy information. If the "retry attempts" are exhausted, at 265, then the authentication processing may fail, as depicted at 235.

If the verification attempt, at 265, is successful, then the first principal may be forced, depending upon the policy information, to respond to additional authentication queries regarding the secondary identifiers, at 255. Alternatively, processing associated with 245-255 may be repeated any number of times using different sets of select identifiers as may be required by the policy information.

Once the first principal has authenticated in accordance with the policy information, at 266, its identity may be authenticated. Authentication may include generating an authentication credential on behalf of the first principal for use in authenticating its identity to the second principal. In such a scenario, a token may be generated to allow the second principal, or entity acting on behalf of the second principal, to obtain the generated authentication credential.

After successfully authenticating the identity of the first principal, at 270, the authentication service may redirect the request to the initially identified target resource or second principal. If an authentication credential was generated, at 266, the redirection URL may include the associated token. Or, in the event the Liberty or SAML POST profile is being used, the authentication credential generated, at 266, may be embedded into the redirected request. There are a number of different mechanisms and techniques that may be employed to include the credential or credential identifying information with the redirected request, the embodiments of this invention should be not read as limited to any particular technique or mechanism.

The redirection, at 270, may have directed the first principal to a resource provided by a second principal, as depicted at 275. In this case, the receiver of the request (a front-end service, such as the one presented with respect to the method 100 of the FIG. 1 that provides access control to the second principal) may identify the request as including authentication information. As such, the receiver may issue a request to obtain the authentication credential associated with the first principal, the request being received at 280. The request may be issued over a communication link secured via mutually authenticated SSL. The request, at 280, may include identifying information included in the redirection URL, at 270. Alternatively, if no authentication credential for the first principal was generated, at 240, but instead a connection or session based authentication scheme was used, the authentication service may generate a credential for the first principal when the request, at 275, is received. At 285 the authentication credential may be provided to the requester who may then verify the credential and authenticate the first principal, providing the first principal with access to the application (second principal or resources of the second principal).

Figure 3:
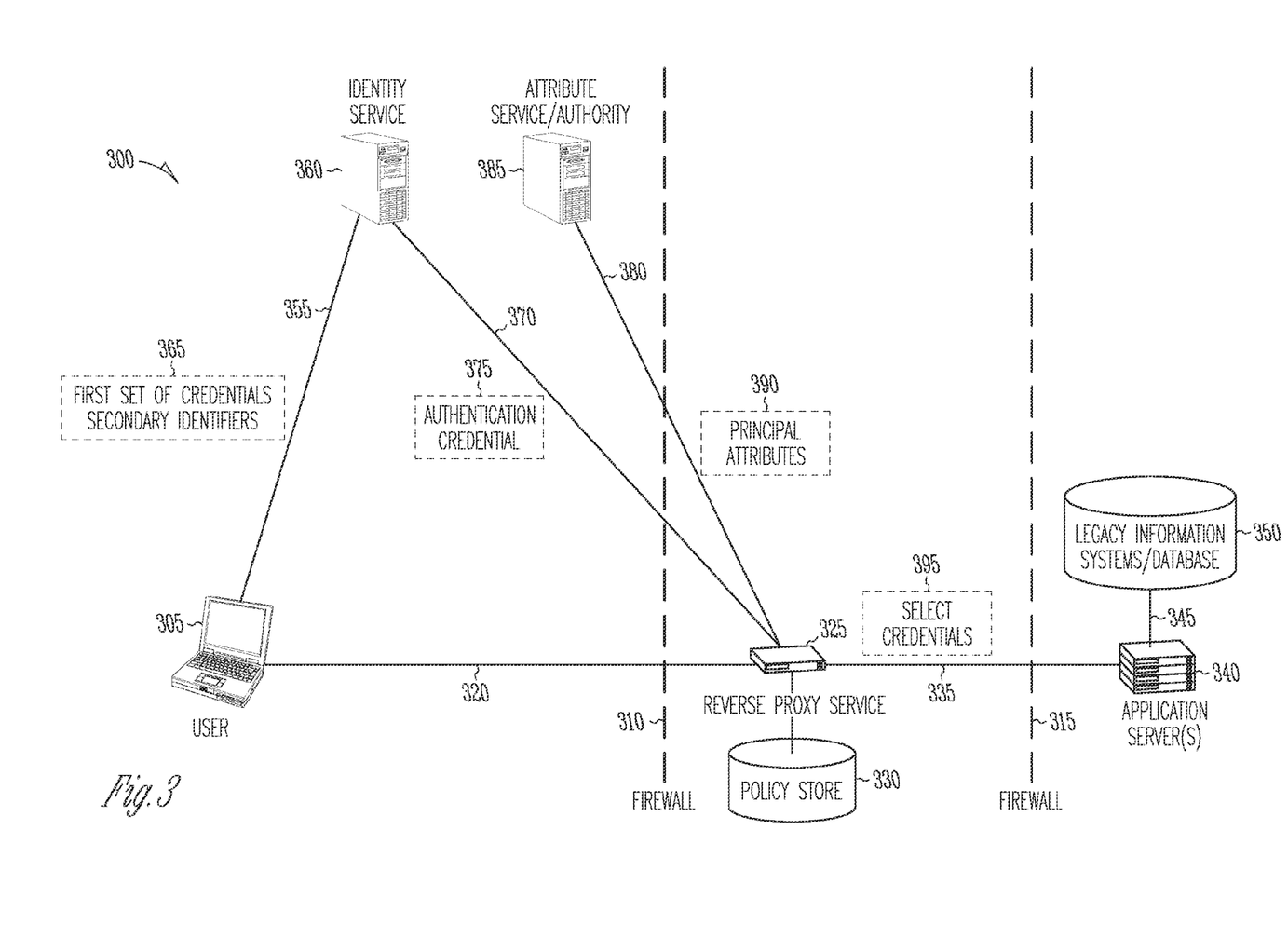
FIG. 3 illustrates a diagram of a multifactor authentication system, according to an embodiment of the invention.

FIG. 3 is a diagram of a multifactor authentication system 300, according to an embodiment of the invention. The multifactor authentication system 300 is implemented in a machine-accessible and readable medium and is accessible over a network. The network may be wired, wireless, or a combination of wired and wireless. According to an embodiment, the multifactor authentication system 300 implements, among other things, the method 200 of the FIG. 2 and interacts with the method 200 of the FIG. 1.

The multifactor authentication system 300 includes an identity service 360. The identity service 360 may be implemented as an authentication service, such as the authentication service represented by the method 200 of the FIG. 2. The identity service 360 interacts with a variety of components. These components and sample architectural arrangements will now be discussed in detail.

It is noted that the FIG. 3 is presented for purposes of illustration and comprehension only and that some components may be added or removed or even situated or configured differently without departing from the teachings presented herein.

In an embodiment, the multifactor authentication system 300 may deploy or utilize a two firewall architecture 310 and 315, forming a network security barrier between an internal and external network. The external network may include entities logically disposed "outside" of a first firewall 310 (to the left of firewall 310 in the FIG. 3). The internal network may include entitles logically disposed "inside" of a second firewall 315 (to the right of firewall 315 in FIG. 3). First firewall 310 may be configured to accept certain types of network traffic from entitles disposed in the external network. Second firewall 315 may be configured to reject traffic from the external network subject to a few well-defined and carefully managed exceptions. In such a network configuration or architectural arrangement, the logical area between the firewalls 310 and 315 may be referred to as a DMZ. This area is so named because entities logically disposed therein are more vulnerable to network attack than those within the internal network as entities in the DMZ are exposed to incoming connections from the external network, some of which may be malicious.

In such embodiment, a first principal represented by computer user 305 may attempt to access a web-service provided by a second principal represented by application servers 340. The application server 340 may be logically disposed behind firewall 315 within the internal network. The reverse proxy 325 (such as the front-end service represented by the method 100 of the FIG. 1) may be disposed in the DMZ in order to receive incoming connections. In this configuration, connections from external users 305 (first principals) may accepted by the reverse proxy 325. The reverse proxy 325 may then process the request message, route it to the application servers 340, retrieve the response from the application servers 340, process the response, and route it back to the requesting principal 320.

It is to be understood that the reverse proxy 325 may be any front-end service to a legacy application server 340, such that the reverse proxy 325 does not have to be a reverse proxy per se. Thus, the use of the term "reverse proxy" is used for convenience and comprehension herein and below and may include any front-end service capable of intercepting access requests to the legacy application server 340 or interposed architecturally in front of application server 340, such that select traffic directed to the application server 340 passes through or is inspected and handled by the front-end service.

In order to access the application servers 340 (second principal), user 305 (first principal) may employ a computer running an Internet WWW browser such a Mozilla Firefox, etc. Responsive actions performed by user 305, WWW browser may issue an HTTP GET request directed to application servers 340 via Internet communications channel 320. This message may be routed to the reverse proxy 325 which, due to the configuration of firewall 310, may accept the request. Responsive to the receipt of the request, the reverse proxy 325 may access policy information 330. This access could be performed in any number of manners. The policy storage 330 may be implemented as an attached disk storage system, RAM, combinations of memory and storage, etc. As such, the applications running in conjunction with the reverse proxy 325 may access the policy information 330 directly, and the policy data may be disposed within the DMZ as shown in FIG. 3. Alternatively, if policy store 330 is implemented as a database or directory service accessible via a network connection, it may be disposed within the internal network behind firewall 315.

After the policy information 330 is obtained, the reverse proxy 325 may determine that user 305 (first principal) is required to authenticate its identity before accessing application servers 340 (second principals). Alternatively, the reverse proxy 325 may detect an authentication request from application servers 340 responsive to a request from user 305. If the determining indicates that authentication is required, the applications running in conjunction with reverse proxy 325 may determine whether user 305 was previously authenticated and also if the associated credential with the previous authentication is in fact still valid. Similarly, the applications may inspect the request and/or the request URL to determine if authentication information is included in the request. If the evaluation indicates that no authentication information for user 305 is available, the policy information 330 may be consulted to determine the identity service or an authentication service 360 that may be used by user 305 to authenticate its identity. The identity service 360 may be implemented as the authentication service represented by the method 200 of the FIG. 2.

The reverse proxy 325 may redirect user 305 to the identity service 360 to perform the required authentication using Internet communication channel 355. The interaction of user 305 with the identity service 360 is described in detail in conjunction with FIG. 2 and FIG. 4, discussed below. During the authentication process, user 305 may be required to produce a first set of credentials along with secondary identifiers 365. After successfully authenticating the identity of user 305, the identity service 360 may redirect user 305 to the reverse proxy 325 via communications link 320.

Upon receipt of the redirected request, the reverse proxy 325 may identify authentication information embedded within it. This information could include a token identifying an authentication credential 375 encoded within the URL as in the Liberty and SAML specifications. Alternatively, the request itself may include an authentication credential 375 as an HTTP POST parameter. There are a number of ways authentication information may be included in the redirected request. The embodiments of the invention should not be read as limited to any particular technique.

If the reverse proxy 325 identifies token information within the redirected URL or request, the reverse proxy 325 may issue a request for the authentication credential 375 to identity service 360 over secure communication channel 370. Channel 370 may be secured in a number of different manners including, but not limited to, mutually authenticated SSL. Responsive to the request, the identity service 360 may provide the authentication credential 375 associated with user 305 (first principal). Upon receipt of the credential 375, whether transmitted over channel 370 or included in the redirected request, the reverse proxy 325 may validate its authenticity. Such validation could include the verification of a digital signature on the credential 375 itself as described with respect to the method 100 of the FIG. 1. Alternatively, the credential 375 may be validated based on the communications channel 370 used to transmit it. For example, if the communications channel 370 was secured via mutually authenticated SSL, the identity of the identity service 360 was validated via the exchange of PKI signatures during the SSL handshaking process.

After verifying the authenticity of the authentication credential 375, the reverse proxy 325 may authenticate the connection of the user 305 to the reverse proxy 325. The connection may be authenticated in a number of ways. In an embodiment, the use of web-browser cookies may be used to allow the revere proxy 325 to identify subsequent requests with the authenticated user 305. Alternatively, URL rewriting may be employed which encodes session identifying information into the URLs of subsequent requests directed at reverse proxy 325. The embodiments of this invention should not be read as limited to any particular mechanism associated with authentication and/or session management.

After successfully authenticating the session of user 305, a request for the resource may be issued to the application servers 340 (second principals). Reissuing the request may be done in a variety of manners. For instance, in the Liberty and SAML technologies, the request as redirected from the identity service 360 may contain a URL tag indicating the resource the user 305 ultimately wishes to access. In the Liberty and SAML specifications, this URL is referred to as the "target URL." Alternatively, the applications running in conjunction with the reverse proxy 325 may cache the request URL before the user 305 is redirected to the identity service 360. Then, when user 305 is redirected to the reverse proxy 325, the cached URL may be used to reissue the request.

Before issuing the target URL request to the application servers 340, the reverse proxy server 325 may access the policy store 330. The policy information 330 may indicate that the application servers 340 themselves require select credentials 395 in order to authenticate the user 305. This situation could arise if the application servers 340 originally included a proprietary authentication system. Thus, rather than modifying application server code, the reverse proxy 325 may be configured to provide the select credentials 395 that the application servers 340 expect via 335. Similarly, the application servers 340 may themselves need to access a legacy information system (IS) or database 350 via link 345 in order to provide the services requested by user 305. As such, the application servers 340 may need the select credentials 395 in order to access data specific to user 305 as required by the application. Given the disparate uses of the credentials 395 by the application servers 340 (some of which may not be strictly security related), the select credentials 395 may be completely distinct from those employed by user 305 to authenticate its identity to identity service 360.

Once the select credentials 395 expected by the application servers 340 are identified from the policy information 330, the reverse proxy 325 may make a determination as to whether such credentials 395 are available. For instance, the select credentials 395 may have been included in the authentication credential 375. This may occur if some of the select credentials 395 were obtained during the authentication interaction between user 305 and the identity service 360.

If the determination is made that the required select credentials 395 are not available to the reverse proxy 325, then they must be obtained. There are a number of ways this may be accomplished. For example, a Liberty or SAML attribute request could be issued to a Liberty of SAML attribute authority. The identity of the attribute authority 385 may be specified in the policy information 330 or within the authentication credential 375 itself. The attribute request may be made via communication channel 380 and secured similarly to channel 370. Responsive to the request, attribute service 385 may reply with principal attributes 390 corresponding to the select credentials 395 required by application servers 340 (second principals).

Upon receipt of the principal attributes 390, the reverse proxy 325 may store them in a cache. The attributes 390 may then be used as the select credentials 395 to authenticate the connection between the reverse proxy 325 and the application servers 340. Such proxy-authentication may de done in a variety of ways. For example, the front-end service 325 may add an HTTP "authorization header" to HTTP requests originating from user 305. The authorization header information may include the select credentials 395 expected by the application servers 340. In another embodiment, the application servers 340 may require that the select credentials 395 be submitted via an HTML form. In this case, the front-end service 325 may identify the form as an authentication request, populate the form fields with the required credentials 395, and submit the form to the application server 340. There are a number of different mechanisms by which the reverse proxy 325 may authentication its connection to application servers 340 with the identity of user 305 (first principal), the embodiments of the invention should not be read as limited to any particular proxy authentication technique.

Once the expected principal attributes 390 have been obtained, cached, and the select credentials 395 have used to perform a proxy authentication, the front-end service 325 may provide user 305 (first principal) with access to application servers 340 (one or more second principals). Thus, the application servers 340 may be protected using multifactor authentication methods implemented by the identity or authentication service 360, and user 305 may be granted seamless access to the application servers 340 without requiring costly changes to the application server 340 software or hardware.

Figure 4:
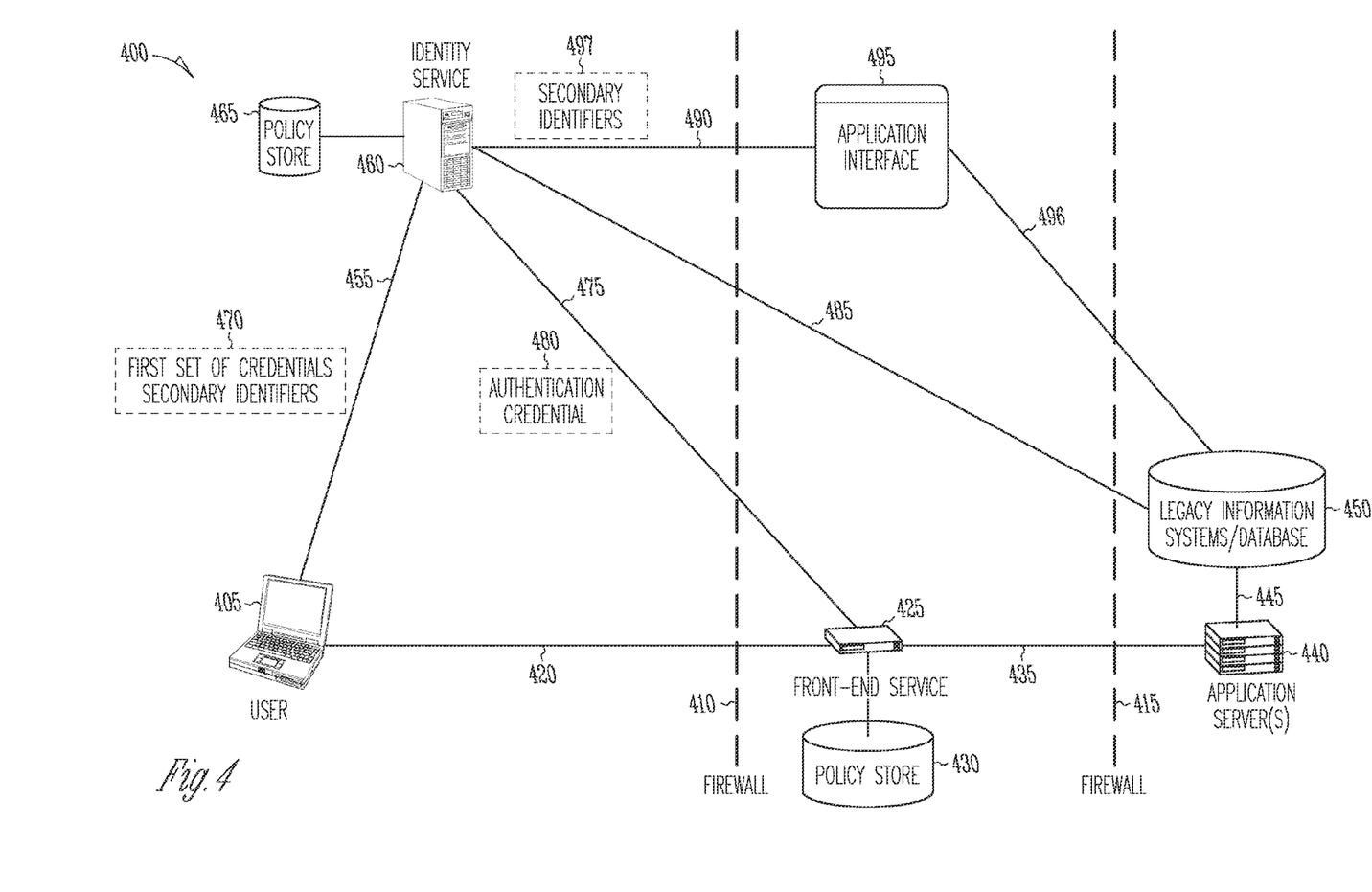
FIG. 4 illustrates a diagram of another multifactor authentication system, according to an embodiment of the invention.

FIG. 4 is a diagram of another multifactor authentication system 400, according to an embodiment of the invention. The multifactor authentication system 400 is implemented in a machine-accessible and readable medium and is accessible over a network. The network may be wired, wireless, or a combination of wired and wireless. According to an embodiment, the multifactor authentication system 400 implements, among other things, the front-end service represented by the method 100 of the FIG. 1 and interacts with the authentication or identity service represented by the method 200 of the FIG. 2 and/or the identity service 360 described with respect to the multifactor authentication system 300 of the FIG. 3.

The multifactor authentication system 400 includes a front-end service 425. The front-end service 425 interacts with a variety of other components. The components and architectural layout depicted with respect to the FIG. 4 is presented for purposes of illustration only. Therefore, it is understood that other components may be added, some components may be removed or subsumed into other components, etc. The interactions and various proposed arrangements of the components vis-à-vis the front-end service 425 will now be discussed in greater detail.

A front-end service 425 may be disposed between a first firewall 410 and a second firewall 415. The front-end service 425 may be configured to receive incoming requests from first principals 405 (users) disposed in the external network. The front-end service 425 may receive such requests and perform additional processing on the requests in accordance with policy information 430, and the route the processed requests to application servers 440 (second principals) via 435. Application servers 440 may interact with a legacy IS system or database 450 over communications link 445 to provide a useful application to external network user 405 (first principal) such as a useful application providing access to an online bank account of the user 405.

It may be desirable to add security measures to the application servers 440 to prevent unauthorized access. As discussed above, custom or proprietary security solutions may be expensive, time consuming, and error prone. As such, it may be desirable to incorporate a system such as the multifactor authentication system 400, which may add multifactor authentication security features without requiring significant changes to application servers 440 and thus any legacy information systems/databases 450.

In an embodiment, user 405 (first principal) may wish to access an application hosted by application server 440 (second principal). The user 405 may attempt to access the application via a WWW browser using an HTTP protocol via communication channel 420. The firewall 410 may be configured to allow the incoming connection to reach front-end service 425 configured to receive, process, and route traffic intended for application servers 440. Firewall 415 may be configured to allow the front-end service 425 to use communication link 435 to access application servers 440. Upon receipt of the request, the front-end service 425 may determine that access to the application server 440 is predicated upon the proper authentication of user 405. Alternatively, the applications running in conjunction with front-end service 425 may detect an authentication request from application servers 440 is responsive to a request from user 405. In order to authenticate the identity of user 405, the front-end service 425 may cause the request from user 405 to be redirected over communications channel 455 to an authentication service or an identity service 460.

The authentication service 460 may implemented as the authentication service discussed with respect to the method 200 in the FIG. 2 and/or the identity service 360 discussed with respect to the multifactor authentication system 300 of the FIG. 3. The authentication service 460 may support identity federation protocols and techniques such as those defined in the Liberty and SAML specifications. As such, the authentication service 460 may act as a Liberty Identity Service or Service Provider, SAML Authentication Authority, or the like. Similarly, the authentication service 460 may implement a proprietary or custom authentication protocol. Thus, the embodiments of this invention should not be read as limited to just the disclosed authentication systems and/or protocols.

Upon receipt of the redirected authentication request, authentication service 460 may access policy store 465. The policy information 465 may indicate the particular authentication mechanisms that user 405 is to perform in order to authenticate its identity. In particular, the policy information 465 may specify a first set of credentials 470 and one or more secondary identifiers 497 that are to be produced by user 405 in order to authenticate its identity. In addition to specifying the one or more secondary identifiers 497, the policy information 465 may also indicate how these identifiers 497 may be obtained.

After accessing policy information 465, the authentication service 460 may obtain from user 405 a first set of credentials 470. As discussed above, the first set of credentials 470 may include any number of different authentication materials, including, but not limited to, a username and password combination, a Smartcard, a token, PKI signature data, biometric information, etc. Upon receipt of this first set of credentials 470, the authentication service 460 may validate the received credentials 470. A number of different verification mechanisms may be employed, as discussed above, such mechanisms may include: a hash based comparison for password based authentication, PKI signature verification, biometric methods, etc.

If authentication service 460 determines the first set of credentials 470 is invalid, user 405 may be given the chance re-enter the credentials 470. The policy information 465 may specify how many retry attempts the user 405 may make before the authentication process fails. Upon authentication failure the user 405 may be redirected to a support site with instructions on how to re-establish its authentication credentials.

If authentication service 460 determines the first set of credentials 470 are valid, the authentication service 460 may obtain one or more sets of secondary identifiers 497 as required by the policy information 465. This policy information 465 may include mapping information, allowing the first set of credentials 470 to be associated with a user record maintained by the application servers 440 or the legacy information systems/database 450. There are a variety of different mechanisms available to perform this mapping as described above.

After a name mapping associated with the first set of credentials 470 has been determined, the authentication service 460 may obtain the one or more sets of secondary identifiers 497. These identifiers 497 may be obtained in a number of different ways. For instance, the identifiers 497 may be available via a SAML or Liberty Attribute Authority; in this case, the authentication service 460 may obtain the identifiers 497 by issuing an attribute request, as described above. Alternatively, the identifiers 497 may be accessible via the legacy information systems or database 450. In this case, the firewalls 410 and 415 may be configured to allow incoming connections from the authentication service 460, which may obtain the identifiers 497 by issuing a network request on communication channel 485 via a protocol such as SOAP, ebXML, etc. Alternatively, the identifiers 497 may be accessed via a user interface 495 associated with the application server 440, legacy information system or database 450. For instance, the information system 450 may provide a TELNET user interface. Such interfaces were common before the widespread adoption of web-services. If such an interface is available, the authentication service 460 may open a terminal connection to the interface 495 via communication link 490 and, possibly using the first set of credentials 470, login as user 405 via link 496. After logging in over 496, the user interface 495 may "screen-scrape" the UI 495 to obtain the secondary identifiers 497. In order to use this approach, firewall 410 and 415 should be configured to allow the authentication service 460 to initiate a TELNET connection. There are a number of other techniques that could be employed to obtain the one or more secondary identifiers 497; the embodiments of the invention should not be read as limited to any particular approach.

As discussed above, the select identifiers 497 may include "short-term" identifying information. The exact contents of such information will likely depend upon the type of application user 405 wishes to access. For example, if the application service 440 is an online banking system, the "short-term" identifying information could include the user's 405 last bank balance, transaction time, etc.

After obtaining the one or more secondary identifiers 497, user 405 may be prompted to verify its knowledge of the identifiers 497 via communications link 455. The communications link 455 may be secured via SSL to prevent disclosure of the credentials. The user 405 may respond to the request for the identifiers 497 via the link 455. Upon receipt of the identifiers 497 the authentication service 460 may verify the user's 405 knowledge of the identifiers 497. If successful, the user 405 may be expected, depending upon the policy information 465, to respond to additional authentication queries regarding the secondary identifiers 497. Further, upon verification of a first set of secondary identifiers 470, the authentication service 460 may be required by the policy 465, to obtain and verify the user's 405 knowledge of additional secondary identifiers 497.

Once user 405 has authenticated in accordance with the policy 465, the authentication service 460 may generate an authentication credential 480 for the user 405. The credential 480 may be used to authenticate the identity of user 405 to other sites and/or principals 440. User 405 may then be redirected back to the application server 440. The URL used to redirect user 405 may include a token identifying the authentication service 460 and authenticated credential 480 generated for user 405. The token may be encoded into the URL string in accordance with the Liberty or SAML specifications. Alternatively, the authentication credential 480 may be encoded into the request itself. For instance, if the authentication service 460 were acting as a SAML Authentication Authority performing the SAML POST profile, the credential 480 transported via the as the payload of an HTTP POST to the application server 440.

The redirected request from authentication service 460 may be routed to the front-end service 425. The front-end service 425 may identify the request as originating from authentication service 460 and may retrieve the authentication credential 480 as described above. After obtaining the authentication credential 480, the front-end service 425 may validate it and authenticate the connection of user 405.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A computer-implemented method processed by a reverse proxy, the method comprising:
   intercepting, by the reverse proxy, an attempt by a first principal to access a second principal;
   determining, by the reverse proxy, whether authentication credentials are available for authenticating the first principal, where the authentication credentials are defined by a policy and the policy identifies an identity service that is to authenticate the first principal and the policy also identifies the authentication mechanism to be used by that identity service, the authentication credentials are used for multifactor authentication by authenticating the first principal with some of the authentication credentials by using the authentication mechanism and the identity service defined in the policy and by authenticating the first principal to the second principal via a different authentication mechanism expected by the second principal and by using select ones of the authentication credentials, where the second principal is a legacy service that does not support multifactor authentication;
   passing, by the reverse proxy, the select ones of the authentication credentials to the second principal giving access to the first principal if the authentication credentials are available, and wherein the second principal expects the select ones of the authentication credentials for access by using the different authentication mechanism of the second principal; and
   redirecting, by the reverse proxy, the first principal to an identity service if the authentication credentials are unavailable for the first principal to authenticate with the identity service using the authentication mechanism defined in the policy and on successful authentication the first principal is supplied the authentication credentials.

2. The method of claim 1 further comprising, acquiring, by the reverse proxy, the authentication credentials from the identity service in response to the redirection.

3. The method of claim 2, wherein acquiring further includes obtaining the authentication credentials via a secure communications link.

4. The method of claim 2 further comprising, caching, by the reverse proxy, the authentication credentials if available or if subsequently supplied by the identity service.

5. The method of claim 2, further comprising:
   accessing, by the reverse proxy, the policy associated with the second principal; and
   determining, in accordance with the policy and by the reverse proxy, the select authentication credentials to acquire from the identity service, if the authentication credentials are unavailable.

6. The method of claim 1, wherein redirecting to an identity service further includes an intermediate redirection to a service provider.

7. The method of claim 6 further comprising, acquiring, by the reverse proxy, the authentication credentials and the select authentication credentials from the service provider in response to the redirection.

8. A computer-implemented method to process on a computer, comprising:
   receiving, by the computer, credentials associated with a first principal, the credentials used to authenticate the principal to a first authentication mechanism not compatible with the a second principal and a second authentication mechanism expected by the second principal, where the first principal is attempting access to the second principal and multifactor authentication is used via the first authentication mechanism and the second authentication mechanism;
   obtaining, by the computer, at least one identifier associated with the first principal from a second principal using at least one of the credentials and in response to a policy;
   verifying, by the computer, the at least one identifier with the first principal via the second authentication mechanism expected by the second principal; and
   generating, by the computer, an authentication credential for the first principal, granting it access to the second principal in response to verifying some of the credentials with the first authentication mechanism and the at least one identifier against select ones of the credentials using the second authentication mechanism.

9. The method of claim 8 further comprising, receiving, by the computer, an authentication request from the first principal for access to the second principal.

10. The method of claim 9 further comprising, redirecting, by the computer, the first principal to the second principal.

11. The method of claim 10 further comprising, communicating, by the computer, with one or more front-end services of the second principal over a secure communications link.

12. The method of claim 11 further comprising:
   receiving, by the computer, a request associated with a second principal for a credential for authenticating the first principal;

generating, by the computer, the credential for the second principal; and providing, by the computer, the credential.

13. The method of claim 8, wherein obtaining further includes obtaining the at least one identifier from the second principal via an interface associated with the second principal and by posing as the first principal using the credentials to gain access to the second principal.

14. The method of claim 8 further comprising:

accessing, by the computer, the policy associated with the second principal; and determining, in accordance with the policy and by the computer, the at least one identifier to be requested from the second principal.

15. A system, comprising:

an identity service, having a processor and a memory the identity service is to be in communication with a first and second principal, at least one credential is to be received from the first principal, and at least one identifier associated with the first principal is to be obtained from the second principal using the at least one credential, and, if the first principal verifies the at least one identifier via the identity service, an authentication credential is to be generated by the identity service for the first principal, the authentication credential is to be subsequently used by the first principal to gain access to the second principal, and the at least one identifier is identified by the identity service pursuant to a policy, the policy defines a first authentication mechanism that the identity service authenticates the principal against and that is not supported by the second principal, also, the policy defines a second authentication mechanism that the second principal expects and that the identity service validates via the at least one identifier and the at least one credential using the second authentication mechanism, the first and second authentication mechanisms result in multifactor authentication, which the second principal does not support but which the identity service provides via the first authentication mechanism.

16. The system of claim 15, wherein the identity service is to receive an authentication request from the first principal.

17. The system of claim 16, wherein the authentication request is to be received by the identity service from a front-end service that first receives the authentication request from the first principal.

18. The system of claim 15, wherein the identity service is to respond to a request for the authentication credential.

19. The system of claim 18, wherein the authentication credential is to be provided via a secure communication's link.

20. The system of claim 15, wherein the at least one identifier is obtained from the second principal via a user interface provided by the second principal.

* * * * *